United States Patent [19]

Kamata et al.

[11] Patent Number: 4,468,716
[45] Date of Patent: Aug. 28, 1984

[54] GAS-INSULATED SWITCHGEAR

[75] Inventors: Isao Kamata, Sagamihara; Satoshi Ohyama, Yokohama, both of Japan

[73] Assignee: Tokyo Shibaura Denki Kabushiki Kaisha, Kawasaki, Japan

[21] Appl. No.: 349,901

[22] Filed: Feb. 18, 1982

[30] Foreign Application Priority Data

Feb. 27, 1981 [JP] Japan ................................ 56-26907

[51] Int. Cl.³ ............................................. H02B 5/02
[52] U.S. Cl. ............................. 361/333; 200/118 B; 200/145; 361/335; 361/131
[58] Field of Search .......................... 200/145, 148 R; 361/131, 333, 335

[56] References Cited

U.S. PATENT DOCUMENTS

| | | | |
|---|---|---|---|
| 3,777,218 | 12/1973 | Kessler | 361/131 |
| 3,881,766 | 5/1975 | Pratsch | 361/131 |
| 3,903,387 | 9/1975 | Sasaki et al. | 200/145 |
| 4,291,363 | 9/1981 | Oishi | 361/333 |

Primary Examiner—Robert S. Macon
Attorney, Agent, or Firm—Oblon, Fisher, Spivak, McClelland & Maier

[57] ABSTRACT

A gas-insulated switchgear apparatus comprises,
(a) first and second grounded tanks filled therein with insulating gas,
(b) a circuit breaker unit enclosed in the first tank,
(c) a disconnecting switch unit connected to an axial extension of the first tank and enclosed in the second tank partitioned off the first tank through a gas,
(d) a third grounded tank having a connecting conductor filled therein insulating gas and connected to an axial extension of the second tank as partitioned off the second tank through a gas,
(e) a grounding switch connected to the third tank in an opposite side of the disconnecting switch unit, and
(f) a lightning arrester connected to the third tank.

5 Claims, 2 Drawing Figures

GAS-INSULATED SWITCHGEAR

BACKGROUND OF THE INVENTION

The present invention relates to a gas-insulated switchgear and, more particularly, to a gas-insulated switchgear for which a constitution of a composite gas-insulated switchgear is improved.

A composite gas-insulated switchgear with an increasing production lately is constituted generally as shown in FIG. 1. In the drawing, 1 denotes a breaker enclosing a breaking unit together with SF$_6$ gas in a grounded horizontal tank, 2 denotes an air bushing, which is placed on one end of the breaker at one terminal part of the switchgear. It is also placed on a tank of a disconnector 3 provided on the other end of the breaker 1 at the other terminal part. The terminal part of each air bushing 2 is connected to an air bus part insulated atmospherically or a lead for line circuit. One terminal part 4 of the disconnector 3 and a terminal part 4a of the breaker 1 are connected through a window type current transformer 5 intermediately. A terminal part 8 of a grounding switch 7 is provided on a terminal part 6 connected to the bushing 2 of the disconnector 3. Then, a lightning arrester 9 is provided for coordination of insulation between the gas-insulated switchgear and a lightning surge, a terminal part 9a of the lightning arrester 9 is connected to the terminal part 6 of the disconnector 3 with a conductor 10, and an electrostatic capacity type of intermediate electrode 11 to detect a voltage on the line side by means of said conductor 10 is arranged cylindrically as coaxial with the conductor 10.

In such constitution, since the grounding switch 7 is arranged on a portion coming comparatively upper at the disconnector 3, its operation involves a producing of various metal powders through sliding, and such powders drop into the tank of the disconnector 3 and thus come to deposit on an insulating spacer 12 to support the one terminal part 4 of the disconnector 3. The situation that the metal powders stick to the insulating spacer 12 may invite a deterioration, after all, in insulating performance of the gas-insulated switchgear. Particularly of late, a large scale and large capacity transmission (550 KV/12 KA transmission line being 200 km or longer) is being realized, a switching duty of a grounding switch used for the gas-insulated switchgear to be employed for such transmission system becomes severe as compared with that of conventional one accordingly, and the situation is such that a 90 KV/1,500 A induced current breaking is required as an example for the switching ability. To allow the grounding switch to operate in such switching ability, a gas spray function, i.e. puffer spray will be employed on the contact part. However, a large switching mechanism 13 will have to be provided to enclose such grounding switch 7 in the tank of the disconnector 3, which may involve a hardship in consequence. Moreover, the quantity of dusts produced at the time of induced current breaking will increase inevitably to deposit on the insulating spacer 12, which deteriorates a dielectric strength of the insulating spacer 12, therefore an employment of a pollution-proof insulating spacer with a long creeping distance or a spacer somewhat larger in size will have to be taken into consideration. Then, the grounding switch 7 is mounted comparatively at high position, and hence a special operating floor must be prepared for operation and inspection.

SUMMARY OF THE INVENTION

In view of what has been pointed out as above, an object of the present invention is to improve a check working efficiency of the grounding switch, integrate each equipment further in good condition, thereby providing a gas-insulated switchgear capable of improving a reliability to cope with the large capacity transmission age.

Briefly, in accordance with one aspect of this invention, a gas-insulated switchgear is provided which includes (a) first and second grounded tanks filled therein with insulating gas, (b) a circuit breaker unit enclosed in the first tank, (c) a disconnecting switch unit connected to an axial extension of the first tank and enclosed in the second tank partitioned off the first tank through a gas, (d) a third grounded tank having a connecting conductor filled therein insulating gas and connected to an axial extension of the second tank as partitioned off the second tank through a gas, (e) a grounding switch connected to the third tank in an opposite side of the disconnecting switch unit, and (f) a lightning arrester connected to the third tank.

BRIEF DESCRIPTION OF THE DRAWINGS

A more complete appreciation of the invention will be readily obtained as the same becomes better understood by reference to the following detailed description when considered in connection with the accompanying drawings, wherein.

DESCRIPTION OF THE PREFERRED EMBODIMENT

Figure 1:
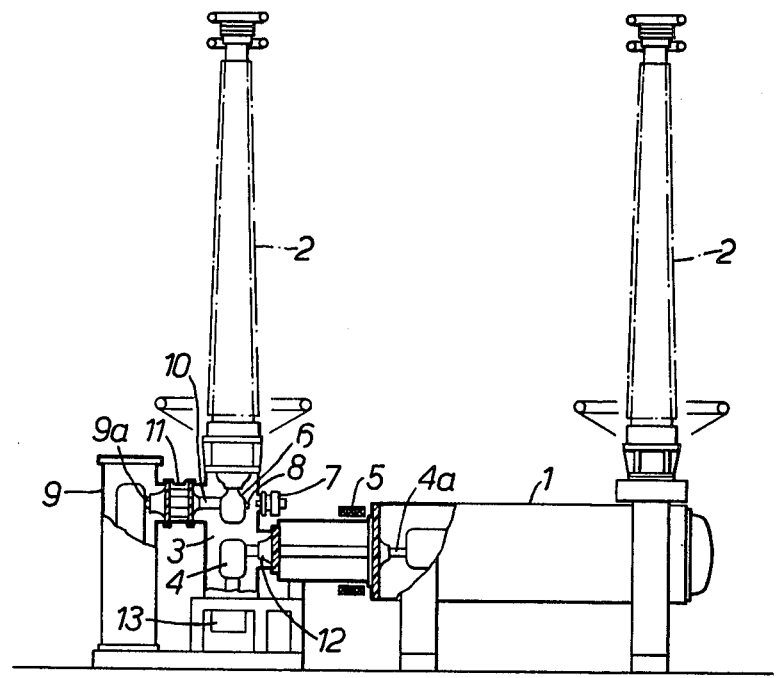
FIG. 1 is a schematic block diagram of a constitution prior to the present invention.
Figure 2:
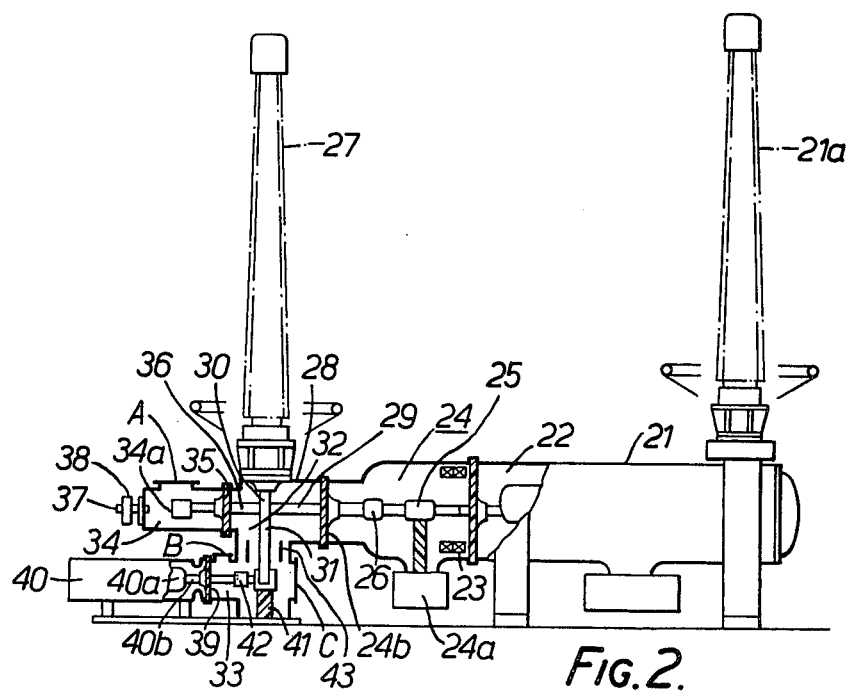
FIG. 2 is a schematic block sectional view representing one preferred embodiment of the invention.

The invention will now be described for one preferred embodiment with reference to the accompanying drawing FIG. 2. In the drawing, 21 denotes a breaker enclosing a breaking unit with its one end connected to a bushing 21a provided on a tank inside a horizontal grounded tank and charged with an insulating gas, and a terminal part 22 is provided to project on its one end axial of said tank. Then, 23 denotes a current transformer arranged in a line of the terminal part 22. And, 24 denotes a disconnector arranged on the other end of said breaker 21, enclosing a disconnecting unit in the tank and charged with an insulating gas, and its one terminal part 25 is connected to the one terminal part 22 of the breaker 21. Then, the other terminal part 26 is led into a bushing support tank 28 on which an air bushing 27 is provided through an insulating spacer 24b. Further, 24a denotes a kinematic part of the disconnector 24. The bushing support tank 28 is provided on an axial extension of the disconnector 24 provided on an axial extension of the breaker 21, and thus it can be pointed out that said breaker 21, disconnector 24 and bushing support tank 28 are coupled to each other linearly. The bushing support tank 28 is given in a longitudinal shape extending perpendicularly to the axial direction of the tank of the breaker 21 with said bushing 27 provided on its upper end. Two openings 32, 33 orthogonal to the axis given by the center conductor 30 of said bushing 27 are provided on the side of bushing support tank 28, which is counter to the disconnector 24. Particularly the one opening 32 is provided at a position where it coincides with the axis of the tank of the breaker 21, and a grounding switchgear 34 is coupled to the opening 32 through an insulating spacer 35 for gas partitioning. A fixed contact-maker 34a of the grounding switchgear 34 is connected to the center conductor 30 of the bushing 27 through a conductor 36. The center conductor 30 is connected to the other terminal part 26 of the disconnector 24 through a conductor 29. The grounding switchgear 34 is charged with an insulating gas in the tank, and a moving contact driven by a switching kinematic part 37 and an operating kinematic part 38 is arranged opposite to the fixed contact-maker 34a. A lightning arrester 40 is coupled to the other opening 33 through an insulating spacer 39 for gas partitioning in parallel with said grounding switchgear 34. The lightning arrester 40 has an internal element 40a enclosed in the tank together with insulating gas, and the internal element 40a is led into the bushing support tank 28 through a conductor 40b. On the other hand, said bushing center conductor 30 has a conductor 31 on its extended axis, and a free end of the conductor 31 is supported by an insulator 41. The conductor 31 and the conductor 40b of said lightning arrester 40 are connected through a detachable conductor 42. Then in the drawing, A, B and C denote manholes each, which are provided for inspection of the fixed contact-maker 34a of the grounding switchgear 34 and also for replacement of the detachable conductor 42. Further, 43 denotes an intermediate electrode arranged on the circumference of the conductor 31 concentrically therewith, and a voltage detecting function is secured through capacity type potential division by said conductor and electrode 43.

The above way of constitution is effective enough to cope with the breaker 21 remarkably improved of late to work on large capacity. Namely, the number of breaking points may be reduced to half by an improvement of the breaking performance. For example, the situation is such that the number of breaking points is reduced from 2 to 1 for 300 KV class and from 4 to 2 for 550 KV class. This suggests that the axial length of the tank of the breaker 21 is shortened. However, when the breaker is particularly considered stand-alone, the bushings 21a, 27 will have to be mounted on the tank slantwise to secure a clearance of insulation between heads of both the bushings. However, in a composite switchgear, the bushings need not be provided slantwise, as each component will be arranged reasonably. Namely, it is easy to provide the bushings perpendicularly to the breaker tank axis for aseismatic strength and also for strength of openings for the bushings to provide, and further a manufacture of the tank is facilitated. Then, a necessary clearance between the bushings can be secured by arranging the disconnector in the middle of the bushings. For example, when the bushings are provided on the disconnector in 550 KV and 2-point breaking class, the clearance is given at 4.5 m or so, which is shorter than the minimum requirement in 5 m for insulation, however, when the bushings are provided on the bushing support tank 28 according to the invention, the clearance may cover 6 m or so to comply with the requirement. Then, the disconnector 24 and the grounding switchgear 34 are isolated in separate vessels according to the constitution, and hence the switching duty of the grounding switchgear 34 applied to a large capacity transmission network is rather severe as described hereinabove, the breaking dust may increase consequently, however, since it is isolated from the disconnector 24, the dust will never pollute the insulator surface. A reliability of the insulating performance will upswing accordingly. Then, the grounding switchgear 34 or the lightning arrester 40 is arranged to come linearly with breaker 21, disconnector 24 and bushing support tank 28, therefore a supporting level of the bushing 27 can be lowered, and a better aseismatic strength is obtainable consequently. Further, the conductor 42 through which to connect the lightning arrester 40 is provided in the bushing support tank 28, which is made detachable, therefore a severe voltage stress can be prevented from being impressed on the element 40a of the lightning arrester 40 by demounting the conductor 42 at the time of withstand voltage test to be carried out in a shop and after installation at a site, thus preventing the element 40a from deterioration. Moreover, the lightning arrester 40 is arranged in the lower space of the bushing support tank 28, i.e. below the grounding switchgear 34, thereby simplifying a support on the weighty lightning arrester 40 and rationalizing the space for arrangement.

According to the constitution given by the present invention, in case a breaker superior in insulation characteristic and miniaturized is employed as a composite switchgear to work for a large capacity transmission system, a necessary distance of insulation between the bushings is secured, a bus part is not particularly required, the system can be miniaturized as a whole, the bushings on both ends are arranged linearly, which is preferable in respect of arrangement for a substation generally.

As described above, according to the invention, a clearance of insulation between the bushings can be secured satisfactorily enough to cope with an operation of the breaker further miniaturized without interposing a special bus unit therefor, and the disconnector and the grounding switchgear are partitioned through gas, therefore a gas working only at a portion of the grounding switchgear is recovered when the grounding switchgear reaches the number of necessary operating times (200 times, for example, as an inspection criterion of a grounding switchgear with current switching ability), and contact can be checked easily through manholes provided in the grounding switchgear. Further, each equipment can be arranged linearly, the bushing supporting level can be kept lower, thereby improving an aseismatic strength. Namely, it can be kept lower by the interpole distance of insulation of the disconnector according to the constitution of the preferred embodiment. Then, there is a merit to obtain easily a structure whereby a breaking dust produced according to current switching of the grounding switchgear is hard to deposit on an insulating spacer. In addition, an actuator for each equipment can be set at comparatively low level, therefore a special operating floor is not particularly required for maintenance and inspection and manual operation of the actuator. On the other hand, at the time of withstand voltage test to be carried out in a shop and after installation at a site, it is desirable that the lightning arrester be detached to avoid an operation of the lightning arrester and also to prevent the arrester element from being deteriorated by overvoltage; a disconnector for the lightning arrester is provided particularly therefor hitherto and is stopped functioning at the time of normal operation so as to function only as a connecting conductor, which is uneconomical indeed, however, a conductor is provided detachably in the bushing support tank according to the invention, which is reasonably detached only at the time of withstand voltage test, thus giving an economical constitution.

Obviously, many modifications and variations of the present invention are possible in light of the teachings of the present invention. It is therefore to be understood that within the scope of the appended claims, the invention may be practiced otherwise than as specifically described herein.

What is claimed as new and desired to be secured by Letters Patent of the United States is:

1. A gas-insulated switchgear apparatus comprising:
    (a) a first grounded tank filled with insulating gas;
    (b) a circuit breaker unit enclosed in said first tank;
    (c) a second grounded tank filled with insulating gas;
    (d) a disconnecting switch unit enclosed in said second tank, said disconnecting switch unit being connected to an axial extension of said first tank and being partitioned off said first tank through a gas;
    (e) a third grounded tank filled with insulating gas, said third tank having a connecting conductor, being connected to an axial extension of said second tank, and being partitioned off said second tank through a gas;
    (f) a first bushing vertically mounted on said first tank;
    (g) a second bushing vertically mounted on said third tank;
    (h) a grounding switch connected to said connecting conductor and mounted on said third tank on the opposite side from said disconnecting switch unit so as to form said circuit breaker unit, said disconnecting switch unit and said grounding switch being in a straight line; and
    (i) a lightning arrester connected to said connecting conductor and mounted on said third tank, said lightning arrester being positioned under said grounding switch and in parallel with the axis thereof.

2. A gas-insulated switchgear apparatus as recited in claim 1 wherein said grounding switch is positioned to coincide with the axis of said first and second tanks.

3. A gas-insulated switchgear apparatus as recited in claim 1 and further comprising voltage detector means mounted on the circumference of said connecting conductor concentrically therewith in said third tank.

4. A gas-insulated switchgear apparatus as recited in claim 1, wherein said third tank and said grounding switch include openings for inspection.

5. A gas-insulated switchgear apparatus as recited in the claim 1, and further comprising a detachable conductor disposed in the third tank for engaging or disengaging the lightning arrester with the connecting conductor of the third tank.

* * * * *